US007273309B2

(12) United States Patent
Ford et al.

(10) Patent No.: US 7,273,309 B2
(45) Date of Patent: Sep. 25, 2007

(54) DISPLAY DEVICE COMPRISING A LUMINOUS ELEMENT WITH AN EMISSION CHARACTERISTIC OF CONTROLLABLE SOLID ANGLE

(75) Inventors: Gary Ford, Atherstone Warks (GB); Juergen Wolf, Villingen-Schwenningen (DE)

(73) Assignee: Siemens AG, München (DE)

( * ) Notice: Subject to any disclaimer, the term of this patent is extended or adjusted under 35 U.S.C. 154(b) by 262 days.

(21) Appl. No.: 11/035,148

(22) Filed: Jan. 13, 2005

(65) Prior Publication Data

US 2005/0146893 A1 Jul. 7, 2005

Related U.S. Application Data

(63) Continuation of application No. PCT/DE03/02064, filed on Jun. 20, 2003.

(30) Foreign Application Priority Data

Jul. 26, 2002 (DE) ............................... 102 34 124

(51) Int. Cl.
*F21V 33/00* (2006.01)

(52) U.S. Cl. ......................... 362/580; 362/84; 362/552

(58) Field of Classification Search .................. 362/84, 362/552, 554, 560, 580
See application file for complete search history.

(56) References Cited

U.S. PATENT DOCUMENTS 5,613,750 A 3/1997 Roe
5,647,658 A 7/1997 Ziadi
5,661,837 A 8/1997 Yamamoto et al.
5,986,792 A 11/1999 Rizkin
6,471,388 B1 * 10/2002 Marsh ........................ 362/559

FOREIGN PATENT DOCUMENTS

EP 1 152 786 11/2001

OTHER PUBLICATIONS

Derwent Abstract—EP 1 152 786 A1, Slow spray metered dose inhaler, inhibits airflow during operation, to prevent powerful jet from depositing aerosol particles inappropriately in oropharynx, whilst permitting soft cloud to enter loungs, the target site; Robert Bosch GmbH, D-70442 Stuttgart (Germany).

* cited by examiner

*Primary Examiner*—Laura Tso
(74) *Attorney, Agent, or Firm*—Siemens AG

(57) ABSTRACT

The invention relates to a display device including a luminous element and a light guide which has coupling locations and decoupling locations and transports a light signal that is emitted by the luminous element. The inventive luminous element has a radiation characteristic, the solid angle of which can be controlled.

11 Claims, 2 Drawing Sheets

DISPLAY DEVICE COMPRISING A LUMINOUS ELEMENT WITH AN EMISSION CHARACTERISTIC OF CONTROLLABLE SOLID ANGLE

CROSS REFERENCE TO RELATED APPLICATIONS

The present application is a continuation of international application PCT/DE03/002064, filed Jun. 20, 2003, which designated the United States, and further claims priority to German patent application DE10234124.9, filed Jul. 26, 2002, the both of which are herein incorporated by reference.

BACKGROUND OF THE INVENTION

The invention relates to a display device comprising a luminous element and a light guide having incoupling and outcoupling locations, the light guide being able to transport a light signal emerging from the luminous element.

In display devices of this type, signals are displayed on a projection surface by means of a differentiating optical signal transmitter via an optically conducting element. In such displays, individual light-emitting elements, or an electronic display, are used. Examples of the application of such display devices are multistatus displays in tacographs or car radios that display a number of display states on a display field via a light guide and, for example, two LEDs. Another application are economy displays, arranged in the form of a ring or bar, that are implemented, for example, by means of 20 light-emitting diodes (LED) or by a liquid crystal display (LCD). The disadvantages of such a display are the complex layout of the circuitry and the large number of discrete components that thereby entail high production costs and a low degree of design freedom.

SUMMARY OF THE INVENTION

It is an object of the invention to provide a display unit of simpler and more cost-effective design.

This object is achieved by a display device having a luminous element and a light guide. The luminous element has an emission characteristic of controllable angle. The light guide has incoupling and outcoupling locations, and is arranged to transport a light signal emerging from the luminous element.

The display unit therefore has a spatially differentiating light source that can be controlled by a controlling or regulating unit. It is thereby possible to supply various display surfaces with a light signal from a single luminous element. In one embodiment, the display surfaces are the outcoupling locations of the light guide. In another design, projection surfaces are provided onto which light emerging from the light guide falls. In a compact design of the display device, the projection surfaces are connected directly to the light guide. They can, however, likewise be realized as separate components. The same holds for the light entrance surfaces of the light guide, which are adapted to the opto-geometrical conditions of the light guide and are positioned in accordance with the light source.

In an advantageous embodiment, the light guide has light channels that direct the incoupled light onto the appropriate display or projection surfaces. Possible problems arising from signals that produce optical crosstalk are limited in the simplest case by optical separation of the light channels, for example, by introducing a non-transmissive layer. However, additional optical channels made from glass or glass fibers and introduced into the light guide are also conceivable. They permit the light to be guided to the projection surface without interference.

The luminous element is configured in such a way that it can change its spatial emission characteristic as a function of a control signal. In one embodiment, an aperture slot that varies its position in accordance with the desired light entrance window is located above the light exit plane of the luminous element.

A mechanically less complicated design is provided by using a light-emitting diode that can vary its emission characteristic in three dimensions. Consideration is given in this regard, for example, to an RC-LED (Resonance Cavity LED) that keeps the complexity of the mechanical design down. With this type of luminous element, "Bragg" mirrors in a light-emitting diode chip ensure that the spatial light intensity distribution curve, the so-called Rousseau diagram, becomes large or small. Thin film LEDs, in particular, can advantageously be used.

In an advantageous embodiment of the invention, the temperature of the chip is controlled not only via the LED current, but also via an additional heating and/or cooling element that is fitted at the smallest possible spacing from a heat sink of the LED chip. A controlling unit ensures that the current parameters are acquired and processed, for example, with the aid of current and temperature comparison tables stored on a computer, for the appropriate alignment of the light distribution curve.

Luminous elements having a sufficiently short wavelength, for example, UV light sources, render it possible to use projection surfaces equipped with wavelength transmitters to provide the light signal with different colors. Light with a wavelength of 400-800 mm is denoted as UV light. Phosphor and other so-called luminous materials whose activator centers emit the energy radiated by the luminous element with the desired color are used as frequency converters. It is also conceivable to use so-called silicon nanocrystals that emit different light of defined wavelengths after irradiation with UV light. Use in a dial is particularly advantageous here.

BRIEF DESCRIPTION OF THE SEVERAL VIEWS OF THE DRAWINGS

The invention is explained in more detail below with the aid of exemplary embodiments. In the drawing.

DETAILED DESCRIPTION OF THE INVENTION

Figure 1:
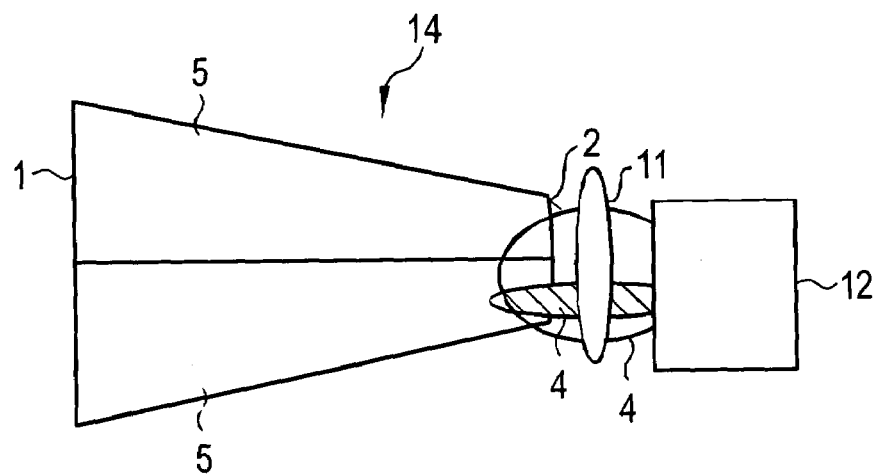
FIG. 1 shows a first embodiment of a display device with a fixed light guide.

FIG. 1 illustrates a first embodiment of a display device according to the invention. Provided at the beginning of a beam path is a luminous element 12 that, depending on how it is driven, can produce a spatially different distribution of light cones, i.e., a different emission characteristic. By way of example, FIG. 1 shows two light cones 4 that, of course, cannot be produced simultaneously, but are illustrated jointly in FIG. 1 for illustrative purposes. A first light cone is narrow and therefore strikes a light entrance region 2 of a light guide 14 such that only a portion of the light entrance region 2 is irradiated by the light cone 4. Formed in the light guide 14 are two light channels 5 that are optically separated from one another, for example, by a reflecting layer. Instead of a reflecting layer between the two light channels 5 of the light guide 14, it is also conceivable to provide other non-transmissive or only partly transmissive layers, for example, a layer that is entirely or partially light absorbing or reflecting. On the other hand, light channels can also be formed by having the light guide 14 comprise a number of bundled glass fibers. Suitable glass fibers for UV light can consist of silica glass or a material resembling silica glass.

Referring to the narrow light cone shown in FIG. 1, the light strikes only in the lower light channel such that at a light exit region 1 of the light guide 14 a light signal is detected only in the region of the lower light channel. The upper light channel, which receives no light signal from the luminous element 12, remains unilluminated.

The other light cone 4 shown in FIG. 1 is substantially larger, and comprises both light channels 5 of the light entrance region 2; a signal is therefore seen on the side of the light exit region 1 in the region of the two light channels 5.

Only two light channels are illustrated in FIG. 1, but it is contemplated that the invention can be extended to light guides having more than two light channels.

Also shown in FIG. 1 is a light-shaping element 11 that is arranged between the luminous element 12 and the light guide 14. This light-shaping element 11 serves the purpose of influencing the shape of the light cones 14 and of contributing to an optimized way of light entry into the light guide 14.

In the exemplary embodiment of FIG. 1, the light guide 14 is immobile with respect to the luminous element 12. In the display device illustrated in FIG. 2, the light guide 14 is arranged moveably. The luminous element 12 emits light that is deflected by a light-shaping element 11 onto the light entrance region 2 of a light guide 14. Provided inside the light guide 14 are a number of light-deflecting elements 9 that deflect light signals transported through the light guide 14. In the beam path, a light signal from a first light-deflecting element is reflected into a horizontal region of the light guide 14. There, two further light-deflecting elements 9 are provided, which serve the purpose of reflecting light signals upward such that they leave the light guide 14 from light exit regions 10.

In the exemplary embodiment of FIG. 1, the light guide 14 itself can be divided into a number of light channels such that light that is irradiated into the light guide 14 in a specific part of the light entrance region 2 is guided inside a specific light channel. The light deflecting elements 9, which reflect light signals in the direction of the light exit regions 10, are specifically designed for individual light channels such that there is a fixed assignment between a specific light exit region 10 and a region of the light entrance region 2.

Another design is a homogeneous light guide which is, therefore, not divided into individual channels. In such a light guide 14, light can be irradiated by the luminous element 12 such that it emerges at a specific location of the light guide 14. This is possible because the light does not traverse the light guide 14 rectilinearly, but is reflected multiple times at the boundary layers to the surroundings of the light guide. It is thereby possible to use the angle of irradiation and the knowledge of the geometrical shape of the light guide 14 to determine at which location a light signal irradiated at a specific angle emerges again. The light-deflecting elements 9, which reflect light signals in the direction of the light exit regions 10, can once again be arranged such that only light signals irradiated at a specific angle emerge at a specific light exit region 10.

A cover unit 8 is provided above the light guide 14. It has sections that are formed as absorption elements 7, and regions that are formed as display elements 6. The display elements 6 are provided for the purpose of visualizing light signals emerging through the light exit regions 10 of the light guide 14. For this purpose, they are formed either as transmission elements, that is to say allow the light beams to pass unimpeded, or else they are formed as projection elements. In the latter case, the surface is, for example, roughened such that the light is scattered. The projection or transmission elements can be colored in order to give the visible light a specific color. The absorption elements 7 ensure that crosstalk is prevented between different transmission and projection elements.

Figure 2:
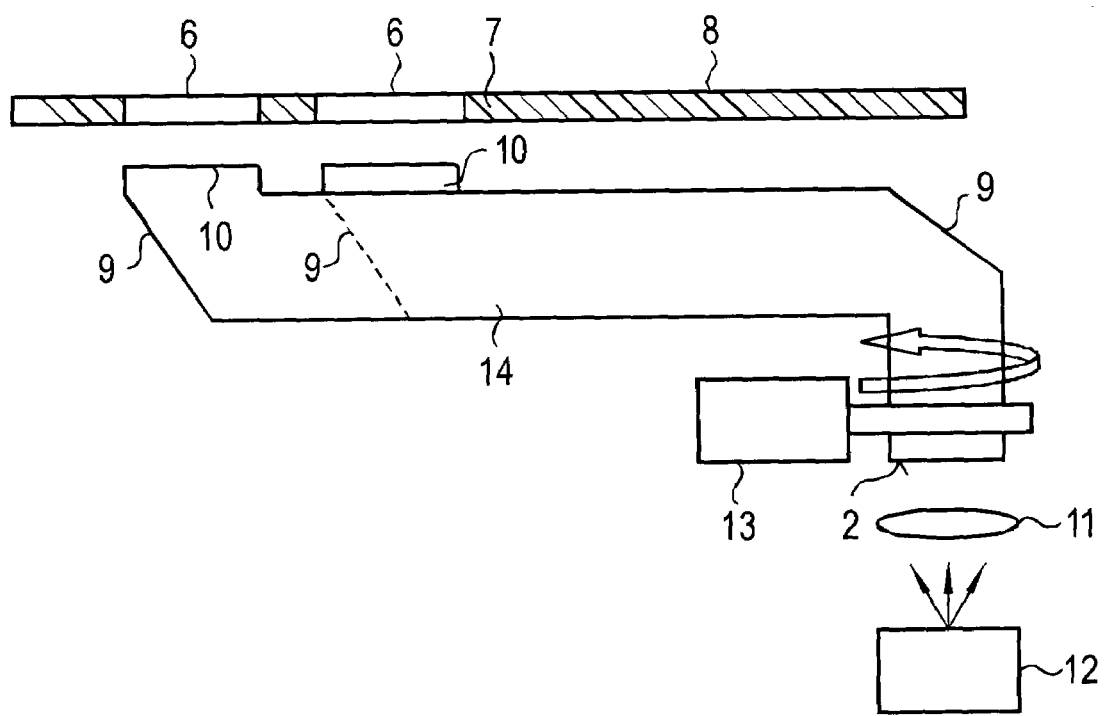
FIG. 2 shows a second embodiment of a display device with a moveable light guide.

In the embodiment shown in FIG. 2, a movement unit 13 is provided which can be used to displace or rotate the light guide 14. It is thereby possible to drive a plurality of display elements 6 with the aid of a single light guide 14.

Figure 3:
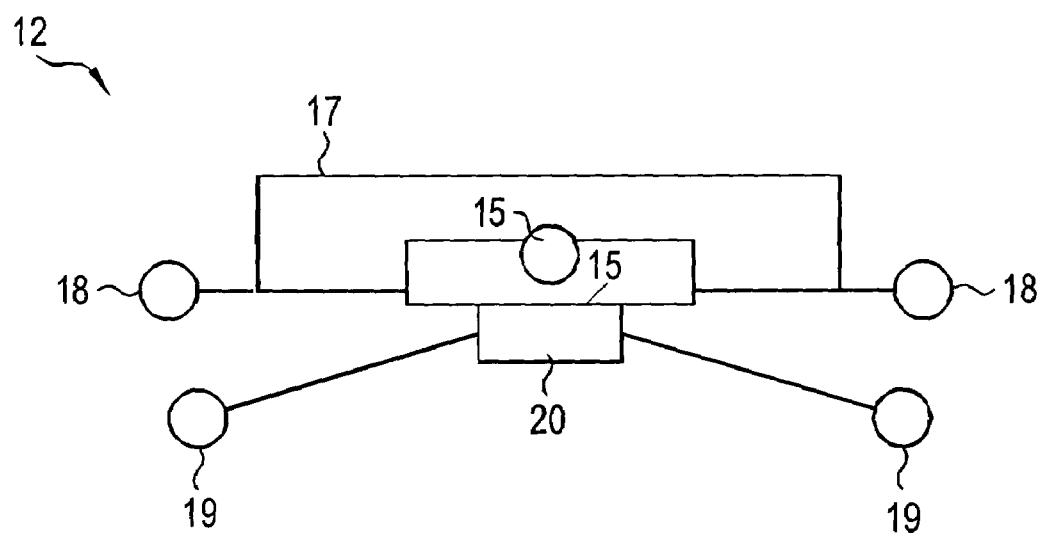
FIG. 3 shows a schematic of an LED luminous element allowing control of the light direction.

A description is given with reference to FIG. 3 of how a luminous element having Bragg mirrors is constructed, and of how the emission characteristic can be controlled. The luminous element 12 has a light-emitting semiconductor chip 15 that is embedded in a reflector housing 17. The semiconductor chip 15 has a cold supply and heat dissipation surface 16 that is connected to a heating element and/or cooling element 20. It is thereby possible for the chip 15 to be kept at the desired operating temperature. The luminous element 12 has terminals 18 for the semiconductor chip 15, and terminals 19 for the heating element 20. The heating or cooling element 20 can be used to set the temperature of the luminous element accurately in order to set the reflection or refraction properties of the Bragg mirror, and thus to maintain the desired emission characteristic.

Figure 4:
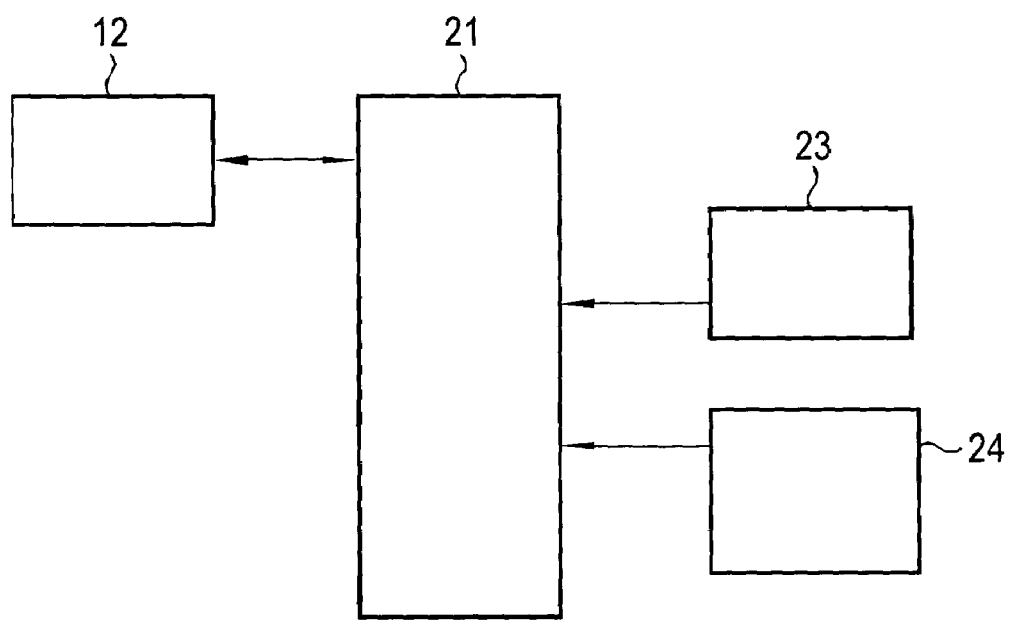
FIG. 4 shows a schematic of the arrangement of a luminous element having a control unit.

FIG. 4 shows schematically how a drive of a luminous element 12 is configured according to one embodiment. The luminous element 12 is supplied with current by a supply device 24. The control or the regulation of the current of the luminous element adapted to a display interior temperature is performed by a control device 21. The control device 21 has an interface for the purpose of being driven by a vehicle bus system 23. An onboard computer is connected to the vehicle bus system to provide information, for example, relating to temperature/current value tables. Known bus systems are, for example, the CAN bus or the networks for vehicles that are known as K-line and MOST.

We claim:

1. A display device comprising:
   a luminous element comprising a light emitting semiconductor device and a thermal element coupled to the semiconductor device, wherein the thermal element is configured to control a temperature of the semiconductor device to control an emission characteristic of the luminous element; and
   a light guide having incoupling and outcoupling locations, the light guide arranged to transport a light signal emerging from the luminous element.

2. The display device according to claim 1, wherein the light guide has at least two light channels each comprising an incoupling and outcoupling location and arranged so as to transport a light signal through each light channel to one projection surface.

3. The display device according to claim 2, wherein the luminous element operates in an ultraviolet region and the projection surface has wavelength transmitters for color transformation.

4. The display device according to claim 3, wherein the projection surface for wavelength transformation comprises nanocrystals that emit different light of defined wavelength after irradiation with UV light.

5. The display device according to claim 4, wherein the nanocrystals comprise silicon nanocrystals.

6. The display device according to claim 1, wherein the luminous element operates in an ultraviolet region and a reflector housing at least partially comprises a resin having nanocrystals.

7. The display device according to claim 6, wherein the nanocrystals comprise silicon nanocrystals.

8. The display device according to claim 3, wherein the light guide is formed by glass fibers comprising one of silica glass and a material equivalent to silica glass.

9. The display device according to claim 1, further comprising alight-shaping element, arranged between the luminous element and the light guide, for guiding light signals to an incoupling location for a respective light signal.

10. The display device according to claim 1, further comprising a movement unit connected with the light guide so as to effect at least one of a translatory and a rotationally symmetrical movement of the light guide.

11. The display device according to claim 8, further comprising a control device having an interface with a vehicle bus system, the control device arranged to control at least one of a light intensity of the luminous element and a position of the movement unit.

* * * * *